US012599461B2

(12) United States Patent
Al Mstrehi

(10) Patent No.: US 12,599,461 B2
(45) Date of Patent: Apr. 14, 2026

(54) IMPRESSION TRAY

(71) Applicant: Rafat Al Mstrehi, Steinfurt (DE)

(72) Inventor: Rafat Al Mstrehi, Steinfurt (DE)

(73) Assignee: Rafat Al Mstrehi, Steinfurt (DE)

( * ) Notice: Subject to any disclaimer, the term of this patent is extended or adjusted under 35 U.S.C. 154(b) by 113 days.

(21) Appl. No.: 18/696,713

(22) PCT Filed: Sep. 26, 2022

(86) PCT No.: PCT/EP2022/076656
§ 371 (c)(1),
(2) Date: Mar. 28, 2024

(87) PCT Pub. No.: WO2023/052293
PCT Pub. Date: Apr. 6, 2023

(65) Prior Publication Data
US 2024/0382294 A1      Nov. 21, 2024

(30) Foreign Application Priority Data

Oct. 1, 2021     (EP) ..................................... 21200553

(51) Int. Cl.
*A61C 9/00*          (2006.01)
(52) U.S. Cl.
CPC ................................... *A61C 9/0006* (2013.01)
(58) Field of Classification Search
CPC .................................................. A61C 9/0006
See application file for complete search history.

(56) References Cited

U.S. PATENT DOCUMENTS

| | | | | | |
|---|---|---|---|---|---|
| 401,792 | A | * | 4/1889 | Scheffler | A61C 9/0006 433/35 |
| 1,084,017 | A | * | 1/1914 | Lautenburg | A61C 9/0006 433/37 |

(Continued)

FOREIGN PATENT DOCUMENTS

| | | |
|---|---|---|
| DE | 9313561 U1 | 12/1993 |
| DE | 4406113 A1 | 3/1995 |

OTHER PUBLICATIONS

"Extended European Search Report", dated Mar. 22, 2022, issued in corresponding European Patent Application No. 21200553.2, Filed Oct. 1, 2021.

(Continued)

*Primary Examiner* — Nicholas D Lucchesi
(74) *Attorney, Agent, or Firm* — PERRY + CURRIER INC.

(57) ABSTRACT

The invention relates to an impression tray for creating a dental impression of at least one tooth, comprising: a base element with a base surface, a first boundary element, and a second boundary element, wherein the first boundary element and the second boundary element are arranged at the base element to form a receiving tray between the first boundary element, the base surface and the second boundary element, that is adapted to receive a first dental impression material, wherein the base element comprises a cavity that at least partially extends underneath the base surface so that the cavity and the receiving tray are separated by a base layer of the base element, and wherein the base element comprises an aperture that is in fluid communication with the cavity and adapted to allow the injection of a second dental impression material into the cavity.

18 Claims, 4 Drawing Sheets

(56)                References Cited

U.S. PATENT DOCUMENTS

Figure 1:
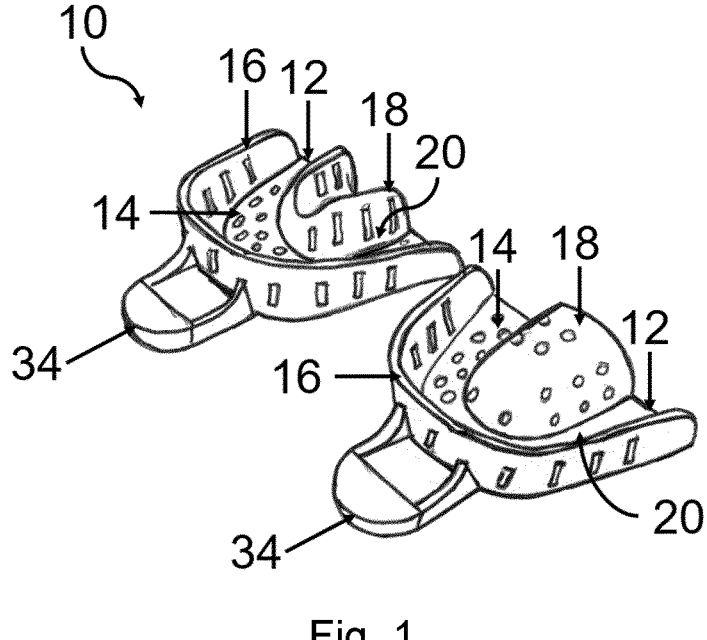

| 1,346,998 | A | * | 7/1920 | Veale | .................. | A61C 9/0006 |
| | | | | | | 433/35 |
| 1,437,844 | A | * | 12/1922 | Henderson | .......... | A61C 9/0006 |
| | | | | | | 433/47 |
| 2,110,860 | A | * | 3/1938 | Grempler | ............. | A61C 9/0006 |
| | | | | | | 433/35 |
| 2,117,666 | A | * | 5/1938 | Hughes | ............... | A61C 9/0006 |
| | | | | | | 433/35 |
| 2,428,773 | A | * | 10/1947 | Beresin | ............... | A61C 9/0006 |
| | | | | | | 433/46 |
| 3,056,205 | A | * | 10/1962 | Ennor | .................. | A61C 9/0006 |
| | | | | | | 433/37 |
| 4,378,211 | A | * | 3/1983 | Lococo | ............... | A61C 9/0006 |
| | | | | | | 433/37 |
| 4,382,785 | A | * | 5/1983 | Lococo | ............... | A61C 9/0006 |
| | | | | | | 433/37 |
| 4,790,752 | A | * | 12/1988 | Cheslak | ................. | G02B 6/001 |
| | | | | | | 433/229 |
| 5,370,533 | A | * | 12/1994 | Bushnell | .............. | A61C 9/0006 |
| | | | | | | 433/214 |
| 5,718,577 | A | * | 2/1998 | Oxman | ................ | A61C 9/0006 |
| | | | | | | 433/29 |
| 2005/0221254 | A1 | * | 10/2005 | Kohani | ................ | A61C 9/0006 |
| | | | | | | 433/37 |
| 2009/0092942 | A1 | | 4/2009 | Wu et al. | | |
| 2010/0021858 | A1 | | 1/2010 | Neuschaefer | | |
| 2012/0225402 | A1 | * | 9/2012 | Crivello | ................... | A61K 6/00 |
| | | | | | | 523/105 |

OTHER PUBLICATIONS

"International Search Report", mailed Jan. 16, 2023, issued in corresponding PCT Patent Application No. PCT/E2022/076656, Filed Sep. 26, 2022.

* cited by examiner

36 ⟶          ⟵ 40

IMPRESSION TRAY

The present invention relates to an impression tray for creating a dental impression of at least one tooth, a method of creating a dental impression of at least one tooth using such an impression tray and a corresponding process of producing a dental prosthesis. Also disclosed herein are a dental prosthesis, the use of an impression tray for creating dental impressions and a kit for creating dental impressions.

In the preparation of dental prosthesis, also called dental restorations, it is often required to obtain an exact impression of the patient's teeth for that the dental prothesis is made. Typically, such impressions are obtained using dental impression trays, that comprise a receiving tray that is roughly formed in the shape of the patient's upper or lower jaw and configured to retain a dental impression material. The filled impression tray is pressed against the teeth of the patient to create an impression in the material, wherein—depending on the substances used—the dental impression material is allowed to solidify around the teeth. The negative reproductions of the teeth obtained this way can e. g. be used to cast models for dental restorations such as crowns and bridges.

In the prior art, impression trays typically have a comparably simple design with a base element that forms the bottom of the receiving tray that is surrounded by a boundary element on both sides that is adapted to retain the dental impression material within the receiving tray.

The techniques used today vary mostly with respect to the sequence of application of the dental impression material, wherein in most cases different types of silicon rubbers of different viscosity are used. The techniques known in the prior art differ with respect to the accuracy of reproducing details of the teeth, in particular in the area around the lower parts of the teeth, in particular below the level of the gums.

The most basic technique uses only a single stage process with only a single dental impression material, which typically has a medium level of viscosity. While this process is time- and cost-efficient, the reproduction of details is oftentimes considered to be not sufficient, limiting the usefulness of this approach whenever a high level of details is required. A modification of the single stage process is a process in which two different types of dental impression materials are provided in the impression tray before placing the impression tray in the patient's mouth. For this, a dental impression material with a comparably high viscosity is provided as a base in the impression tray on which a second layer consisting of a dental impression material with a lower viscosity is added. In this setup, the low viscosity material is used to better penetrate the small cavities around the teeth and to therefore increase the quality of the impression.

An improvement to the one stage process, that allows for obtaining a more accurate negative of the teeth is the two stage impression process, wherein first a dental impression is taken using a first dental impression material with a comparably high viscosity. After the first impression is taken and the tray removed from the patient's mouth, a second dental impression material that typically has a lower viscosity, is applied on top of the first impression, before the impression tray is again placed in the patient's mouth. While comparably time consuming, the respective process typically yields the best results with respect to the details of the impression, in particular with respect to those parts, that are lying below the level of the gums. However, the two stage process is oftentimes difficult to employ for a large number of teeth simultaneously, because the application of the second dental impression material can be time consuming, allowing parts of the low viscosity dental impression material to cure prematurely, thereby reducing the quality of the impression taken.

All the techniques discussed above are often considered to have additional disadvantages. In particular, if high quality impression of the parts of the teeth that lay below the level of the gums are required, the prior art techniques in most cases require the use of gingival retraction cords, that are placed around the teeth before taking the impression, for moving and retracting gum tissue and to increase the clearance between the gum and the tooth in which the dental impression material can flow. The need for such retraction cords is a serious disadvantage, because their application can be very time consuming and is in most cases considered unpleasant by the patient.

In all of the above techniques, the quality of the impression can be hampered by gas inclusions in the dental material and in particular by fluids that remain in the area around the teeth. Most notably, any bleeding of the gum during the preparation of the impression can lead to flawed results and a lack of accuracy. However, such bleeding of the gum is oftentimes facilitated by the application of retraction cords, further increasing the overall time consumption of the method, as the bleeding has to be treated and stopped before making the impression.

For the two stage process, an additional disadvantage can arise if the first impression in the high viscosity dental impression material, that is shaped by the first impression, limits the access of the low viscosity impression material to certain parts of the teeth due to the teeth being tightly packed into the first impression.

In all of the above techniques, in order to obtain a sufficient accuracy, it is typically required to apply the first and second dental impression material over the whole impression tray, leading to an increase in material consumption and the possibility of overflowing material that is oftentimes considered unpleasant by the patient.

It was the primary objective of the present invention to eliminate or at least reduce the disadvantages of the prior art described above.

In particular, it was the objective of the present invention to provide an improved impression tray and a corresponding method of creating dental impressions that allows for a more time- and cost-efficient creation of dental impressions.

Herein, it was an objective of the present invention, that the impression trays and the corresponding method should allow to obtain dental impressions with an increased accuracy, even for details that lie below the level of the gum.

It was a further objective of the present invention, that high accuracy dental impressions should be obtainable with the impression tray and the corresponding method without the need for gingival retraction cords. Likewise, the use of the impression trays and the corresponding method should be resilient to gas inclusions in the dental impression material as well as fluids that remain around the teeth, in particular to any bleeding of the gum.

It was an objective of the present invention, that the impression trays should be easy to manufacture and should be designable in a fashion, that allows for a sustainable reuse of large parts of the impression tray.

It was a further objective of the present invention, that the method should only rely on materials and tools, that are available to the dentist or the worker in a dental laboratory anyway.

It was an additional objective to minimize the amount of preparation required before taking the dental impression and to minimize the waste generation in the process. Furthermore, as the process of taking accurate dental impressions is oftentimes considered difficult, even for trained experts, it was an objective of the present invention to provide a dental impression tray and a corresponding method, that reduces the training required to perform the method and that allows for the acquisition of high accuracy dental impressions with a reduced amount of training and experience required from the workers.

It was a further objective of the present invention that the impression tray and the corresponding method should allow to precisely obtain impressions of individual teeth, thereby saving material and reducing the exposition of the patient to the dental impression materials.

The inventor of the present invention was working to find a solution for the above described problems for more than 20 years. In initial internal experiments, he considered modifying existing impression trays by applying an elastic space holder on the bottom of the receiving tray. For this, an elastic space holder, e. g. a rubber cord, was placed on the bottom of the impression tray before the application of the high viscosity dental impression material. The idea was, that after obtaining the first dental impression, the elastic space holder could be removed from under the cured dental impression material to obtain a hollow space below the first dental impression in the cured dental impression material.

In the respective prototype, the elastic space holder was led out of the receiving tray through an aperture in the outer side wall. After curing of the first dental impression material and removal of the elastic space holder through the aperture in the side wall, the aperture was correspondingly in fluid connection with the hollow channel in the cured first dental impression material. The concept was, that for any tooth of interest the first impression material could be penetrated at the bottom of the impression of the tooth to establish a fluid connection between the hollow channel in the first dental impression material and the impression of the tooth. The receiving tray prepared in this way could then be placed back into the mouth of the patient. Afterwards, a second dental impression material would be pressed through the aperture and the hollow channel towards the impression to adapt (under pressure) to the form of the tooth that is placed in the first impression.

While the inventor considered the general concept to be promising, the respective method overall performed not well enough in internal experiments. In particular, the time required to prepare the dental impression tray with the flexible space holder was increasing the overall time consumption of the process. In particular, the flexible space holder had to be fixed to the bottom of the impression tray, typically with parts of the dental impression material. However, accurate placement of the respective flexible space holder required comprehensive training of the employed workers further limiting the effectiveness of the initial solution.

Furthermore, in order to not deteriorate the adhesion of the dental impression material in the dental impression tray, the potential width of the flexible space holder was intrinsically limited, resulting in a comparably small hollow channel in the first dental impression material. Therefore, in his own experiments the inventor oftentimes had difficulties to accurately hit the small channel in the dental impression material when penetrating the first impression material, leading to the understanding that too much training would be required for the use of the technique. Additionally, the usefulness of the initial method would be limited if specific details would be required for impressions that lay too far away from the small hollow channel established in the dental impression material. Furthermore, the small hollow channel was susceptible to a premature curing of the second dental impression material in the channel.

Apart from procedural aspects discussed above, the initial solution envisioned by the inventor was also found to be unfavourable during the application of the method. First of all, the flexible nature of the space holder could lead to a deformation of the flexible space holder when pressure was applied by the teeth of the patient, which lead to a compression of the flexible space holder, leading to a further reduction in diameter of the small hollow channel. In the experiments of the inventor, this effect could also hinder the removal of the flexible material from under the cured impression material and could even lead to parts of the desired channel not being accessible for the second dental impression material. Overall, the removal of the flexible space holders was found to be comparably difficult and always had the risk of mechanically damaging the first impression and/or the adhesive connection between the first dental impression material and the impression tray during removal. Likewise, the inventor considered it unfavourable that the reusability of the removed elastic space holder was rather low and that the respective method generated a lot of additional plastic waste.

Yet, the main reason for the inventor to redesign his approach was based on the fact, that the best impressions could be obtained when the second dental material was applied into the aperture and the channel with a comparably high pressure that is sufficient to allow for a complete penetration of the second dental material into all details of the teeth, even those lying under the gum, thereby removing any liquids like blood or gas inclusions. However, in own experiments of the inventor, the initial solution did not perform sufficiently well when the required pressures were applied. Most notably, this was due to the fact that the hollow channel was formed between the bottom of the tray and the first dental impression material. Any application of pressure caused by the injection of the second dental material exerted a delaminating force that was threatening to separate the first dental impression material from the underlying impression tray, wherein in several tests the second dental impression material at least partially destroyed the connection between the first dental impression material and the tray. This caused an unwanted leakage of the material from the impression tray, e. g. from between the frame of the impression tray and the first dental impression material, leading to an unwanted release of second dental impression material into the patient's mouth. Even if the pressure applied by the injection of the second dental impression material did not distort the adhesion between the first dental impression material and the impression tray, the inventor found that it led to an unwanted deformation of the first impression that caused a warping and a deformation of the overall impression.

After continued development, the inventor found that the above objective can be surprisingly solved, with a dental impression tray as defined in the claims. Herein, a cavity with an aperture is provided in the dental impression tray itself, thereby removing the need for any elastic space holders and thus removing the above described disadvantages. With the dental impression tray of the present invention, the first dental impression material can be applied directly into the receiving tray without the need for any further preparation, making the creation of the first dental impression equivalent to the well-known two stage process. After obtaining the first impression, the first dental impression material can be penetrated at any point for any tooth of interest with a typical drilling tool, wherein the bottom of the receiving tray is also penetrated in order to establish a fluid connection between the cavity in the impression tray and the impression obtained in the first dental impression material. The so prepared impression tray can be put back into the mouth of the patient after which the second dental impression material is injected under pressure through the aperture into the cavity and the generated though-hole into the first impression, where it adapts to the shape of the tooth with a high local selectiveness and high accuracy. The respective process allows to obtain high quality dental impressions in short times, typically of about 3-4 minutes, without any need for special training or experience, so that a tremendous increase in time-effectiveness is achieved compared to the prior art method that oftentimes requires up to 20 minutes or more for obtaining a dental impression with sufficient accuracy. Beneficially, the detrimental effect of blood and other fluids as well as any gas inclusions is suppressed through the application of pressure during injection and the need for retraction cords is removed for all but the most difficult cases. Compared to the earlier concept of the inventor, the waste generation is reduced and the reliability as well as the time effectiveness of the process are improved significantly. Most importantly, unwanted release of the second dental impression material into the surroundings of the impression tray and delamination of the first impression material and the receiving tray can completely be prevented, as the pressure exerted by the injection of the second dental impression material does not affect the interface between the impression tray and the first dental impression material.

The above objectives are achieved by the subject-matter of the invention as defined in the claims. Preferred embodiments according to the invention are disclosed in the dependent claims and the following description.

Such embodiments, which are designated as preferred below, are combined in particularly preferred embodiments with features of other preferred embodiments. Combinations of two or more of the embodiments described below as particularly preferred are thus very preferred. Furthermore, embodiments are also preferred in which a feature of one embodiment that is designated as preferred to some extent is combined with one or more additional features of other embodiments that are designated as preferred to some extent. Features of preferred methods, dental prosthesis, uses and kits correlate to the features of preferred impression trays.

The invention relates to an impression tray for creating a dental impression of at least one tooth, comprising:

a base element with a base surface,
a first boundary element, and
a second boundary element,
wherein the first boundary element and the second boundary element are arranged at the base element to form a receiving tray between the first boundary element, the base surface and the second boundary element, that is adapted to receive a first dental impression material,
wherein the base element comprises a cavity that at least partially extends underneath the base surface so that the cavity and the receiving tray are separated by a base layer of the base element, and wherein the base element comprises an aperture that is in fluid communication with the cavity and adapted to allow the injection of a second dental impression material into the cavity.

The above-described setup of the base element, the first boundary element and the second boundary element correspond to the typical setup of a dental impression tray that is known to the skilled person. Herein, the base element is the bottom part of the impression tray that has a surface that is part of the receiving tray, i. e. the part of the impression tray that is configured to receive the dental impression material and on which the dental impression material can be placed.

Unlike in the prior art, the base element comprises a cavity that at least partially extends underneath the base surface. In other words, the base layer is the wall of the cavity that is facing towards the receiving tray, the outer surface of which forms the base surface of the receiving tray. This cavity comprises an aperture through which the second dental impression material can be injected into the cavity. By this, the impression tray of the present invention is suitable and adapted to be used in the method of the present invention, wherein a direct fluid communication between the cavity and the receiving tray can be established by penetrating the base layer of the base element, e. g. with a drill.

From the above description, it is clear that the receiving tray is suitable for receiving the first dental impression material and that the aperture is suitable to allow the injection of a second dental impression material into the cavity. In agreement with the skilled person's understanding, the first and second dental impression material are not part of the impression tray according to the invention but are rather provided in the method of the present invention in order to obtain the final dental impression. While the concept of the present invention may be adapted to specific dental impression trays, e. g. impression trays that are exclusively focused around a specific part of the jaw or could be used outside of the human mouth, e. g. to obtain impressions of lost teeth or from animals, typical designs can be identified. Typically, an impression tray according to the invention will be used for most cases, wherein the impression tray is adapted to be placed in a human mouth so that the at least one tooth is arranged in the receiving tray, and/or wherein the first boundary element and the second boundary element are adapted to at least partially retain the first dental impression material in the receiving tray when it is displaced by the at least one tooth, and/or wherein the impression tray is adapted for simultaneously creating a dental impression of a plurality of teeth, preferably of all teeth of the upper or lower jaw.

It is an advantage of the present invention, that the impression tray of the present invention is highly flexible with respect to the material that it is produced from. As the penetration of the base layer in the method of the present invention can e. g. be made with a dental drill, that is suitable for shaping hart materials, the impression tray is not limited with respect to the materials used for its manufacture. An impression tray according to the invention is preferred, wherein the base element and/or the first boundary element and/or the second boundary element comprise a material that is selected from the group consisting of metallic materials and plastic materials, preferably plastic materials, more preferably thermoplastics and thermosets, wherein the elements preferably consist of the respective material. Obviously, the skilled person will in most cases not use materials, that are known to have a detrimental health effect and are not considered to be safe for the application in the human mouth.

The inventors of the present invention found that it is beneficial to use rigid materials, wherein the skilled person is able to identify suitable rigid materials, e.g. plastics. While the application of elastic materials might be interesting for certain applications, the inventors found that the use of an elastic material might propagate pressure changes caused by the injection of the second dental material into the first dental material, potentially leading to a deformation or distortion of the adhesion at the interface between the first impression material and the impression tray. An impression tray according to the invention is preferred, wherein the base element and the base layer consist of a rigid material, preferably a metallic material, a ceramic material or a rigid plastic material.

From the above materials, plastic materials are preferred, because they allow not only for a convenient penetration of the base layer but are also comparably cheap and can be manufactured in a very efficient way, e. g. by injection moulding. While it is possible to prepare the base element and the base layer from a metallic material, e. g. aluminium or titanium, penetrating these materials is often considered to be too difficult and the price of the materials is often considered unfavourable.

For several applications it is beneficial if the base element consists of a single part. This allows for the efficient manufacture of the component, e. g. by injection moulding of plastics. The respective impression trays are typically not reusable. However, this is oftentimes not considered a drawback, as due to reasons of hygiene, different impression trays are used for different patients in most cases anyway. Therefore, an impression tray according to the invention is preferred, wherein the base element consists of a single part.

However, for some applications it might be expedient to use a base element, that consists of two or more parts. This can be beneficial, e. g. for storage of the parts, and the impression tray is e. g. assembled from two or more parts directly before the process. Among those designs with more than one part, a particular beneficial embodiment is a base element, wherein the base layer can be exchanged and the impression tray is configured to, at least partially, be a reusable impression tray. In this embodiment, the main body of the base element could e. g. be made from a metallic material, wherein e. g. a plastic base layer is inserted into the remaining parts of the base element, thereby forming the cavity between the base layer and the main parts of the base elements. If the base layer is penetrated in the method of the present invention, the exchangeable base layer can simply be removed together with the cured dental impression material, while the main body of the base element can be reused, typically together with the first and second boundary element. In this embodiment, generation of waste can be minimized. Correspondingly, an impression tray according to the invention is preferred, wherein the base element consists of two or more parts that are connected to each other, wherein the cavity is preferably formed between a first part comprising the base layer and a second part comprising the aperture, and/or wherein the base element consists of two or more parts, wherein the base layer of the base element is configured to be reversibly and non-destructively detachable from the other parts of the base element, wherein the base layer is preferably configured to be an exchangeable part, wherein the other parts of the base element are preferably configured to be reusable parts.

In order to enhance the adhesion between the base surface and the first dental impression material, the inventor suggest that the base surface should be structured, e. g. by having a plurality of macroscopic protrusions on the surface. Thus, an impression tray according to the invention is preferred, wherein the base surface is a structured surface, wherein the base surface preferably comprises a plurality of macroscopic protrusions, and/or wherein the base surface has a substantially uniform structure over the entire surface area.

The inventor of the present invention was able to provide suggestions for suitable designs of the first and second boundary element. Namely, an impression tray according to the invention is preferred, wherein the first boundary element is a boundary wall, wherein the form of the boundary wall preferably corresponds to the form of the front of a human row of teeth, and/or wherein the first boundary element comprises one or more holes, preferably a plurality of holes, wherein the first boundary element more preferably comprises a grid structure. Likewise, an impression tray according to the invention is preferred, wherein the maximum height of the first boundary element relative to the base surface is in the range of 10 to 38 mm, preferably in the range of 13 to 28 mm, more preferably in the range of 18 to 25 mm. Similarly, an impression tray according to the invention is preferred, wherein the second boundary element is a bulge, wherein the form of the bulge preferably corresponds to the form of a human palate, or wherein the second boundary element is a boundary wall, wherein the form of the boundary wall preferably corresponds to the form of the back of a human row of teeth, and/or wherein the second boundary element comprises one or more holes, preferably a plurality of holes. Additionally, an impression tray according to the invention is preferred, wherein the maximum height of the second boundary element relative to the base surface is in the range of 2 to 30 mm, preferably in the range of 5 to 20 mm, more preferably in the range of 10 to 17 mm.

For most applications, it is especially preferred that the cavity basically fully occupies the space underneath the base surface. In this embodiment, the bottom of the receiving tray, i. e. the base surface, always has a part of the cavity directly underneath it. This embodiment is particularly beneficial, as it provides a high flexibility when penetrating the base layer, and as it is very easy to establish the fluid communication with the cavity without the need to hit a smaller structure underneath the base layer. An impression tray according to the invention is preferred, wherein the cavity basically fully extends underneath the base surface, wherein preferably the projected area of the base surface and the cavity are basically identical in the top view.

As an alternative, it can be preferred to limit the extent of the cavity underneath the base surface. While it is typically recommended to have the cavity extend over the full length, e. g. along the full u-shape of a typical impression tray, it can be preferable to limit the widths of the cavity underneath the base surface. This allows for more flexibility when producing the impression tray and provides overall more stability. In particular if the cavity is placed in the middle of the impression tray, the trade-off with the increased difficulty of hitting the cavity during the penetrating step of the method of the invention is typically minor. In view of this, an impression tray according to the invention is preferred, wherein the cavity extends centrally underneath the base surface, preferably over the whole length of the base surface, wherein the width of the cavity is preferably in the range of 20 to 80%, preferably 30 to 70%, more preferably 40 to 60%, of the width of the base surface.

Although it is possible to use comparably large cavities, the inventor suggest that the volume of the cavity should be kept small in order to reduce the amount of second dental impression material that is required to fill the cavity and to allow for an efficient application of pressure when injecting. Correspondingly, an impression tray according to the invention is preferred, wherein the average height of the cavity underneath the base surface is in the range of 0.1 to 15 mm, preferably in the range of 0.5 to 5 mm, more preferably in the range of 1 to 2 mm.

Although it might be possible to have more than one aperture connected to the cavity, with respect to the efficiency of manufacture and the avoidance of unwanted release of second dental impression material into the mouth, it is explicitly beneficial to limit the number of apertures in the cavity. An impression tray according to the invention is preferred, wherein the cavity comprises exactly one aperture, and/or wherein except for the aperture the cavity is airtight.

In view of the above and considering the method of the present invention, it is clear to the skilled person that the aperture will not be located in the base layer of the base element and therefore not in the base surface for the vast majority of cases or will at least be spatially separated from the parts of the receiving tray that typically receive the first dental impression material. Correspondingly, the aperture does not establish a direct fluid connection between the receiving tray and the cavity. Correspondingly, the skilled person understands that the base layer typically comprises no aperture that is adapted to allow the injection of a second dental impression material into the cavity. Most preferably, the base layer and/or the base surface do not comprise any aperture that is a through-hole. In other words, typically, an impression tray according to the invention will be used for most cases, wherein the base layer is a solid base layer, and/or wherein the base layer comprises no through-holes that would connect the receiving tray with the cavity.

Based on the typical constraints of the placement of the impression tray in the patient's mouth during the creation of a dental impression the most convenient placements for the aperture can be identified. Typically, an impression tray according to the invention will be used for most cases, wherein the aperture extends from the cavity through the base element to the outer surface of the impression tray and/or wherein the aperture is not located at the first boundary element or the second boundary element.

To allow for a convenient injection of the second dental impression material, e. g. with a syringe, the inventors suggest to place a tube at the aperture that can house the injection portion of the respective injection apparatus during the process step. The respective embodiment is particularly preferable because an unwanted release of second dental impression material into the patient's mouth from the syringe can further be prevented. Therefore, an impression tray according to the invention is preferred, wherein the aperture is connected with a tube, wherein the tube is preferably adapted to receive the injection element of an injection apparatus, preferably of a syringe, and/or wherein the tube is preferably part of a handle that facilitates the handling of the impression tray, in particular the placement in the mouth and the removal from the mouth.

As the base layer needs to be penetrated in the method of the present invention, the inventor suggest that the thickness of the base layer should be rather low, wherein preferred ranges can be identified, that still allow for a convenient manufacture of respective impression trays and that reduce the risk of an unwanted penetration of the base layer. Namely, an impression tray according to the invention is preferred, wherein the thickness of the base layer is in the range of 0.1 to 10 mm, preferably in the range of 1 to 3 mm, more preferably in the range of 1.5 to 2 mm.

Hereinafter, the method of the present invention that utilizes the impression tray of the present invention is described in more detail, wherein the understanding is further facilitated by the description of an exemplary process disclosed below for the discussion of the figures. As disclosed above, the invention relates to a method of creating a dental impression of at least one tooth using an impression tray according to the invention, the method comprising the steps of:

a) providing an impression tray according to the invention, b) filling the receiving tray with a first dental impression material to obtain a filled impression tray, c) placing the filled impression tray in a human mouth so that at least one tooth is arranged in the first dental impression material in order to obtain a preliminary imprint of the at least one tooth in the first dental impression material, d) removing the impression tray with the preliminary imprint from the mouth and penetrating the first dental impression material, preferably at the bottom of the preliminary imprint, as well as the underlying base layer with a drilling tool, for forming a through-hole and establishing a fluid communication between the cavity and the preliminary imprint, thereby obtaining a modified filled impression tray, e) placing the modified filled impression tray back into the human mouth so that the at least one tooth is again arranged in the preliminary imprint, f) injecting a second dental impression material through the aperture into the cavity so that the second dental impression material is pressed through the through-hole into the preliminary imprint and adapts to the shape of the at least one tooth to form a final imprint, g) removing the impression tray with the final imprint from the human mouth.

The steps a) to c) correspond to the typical first stage of a prior art two stage process described above. As explained before, the impression tray with the preliminary imprint is then modified with a drilling tool in order to establish a through-hole through the first dental impression material as well as the base layer and to establish a corresponding fluid communication between the cavity in the impression tray and the preliminary imprint in the first dental impression material.

After being prepared in such a way, the impression tray is placed back into the human mouth, wherein a good fit can be obtained between the teeth and the preliminary imprint. After that, the second dental impression material is injected through the aperture into the cavity and pressed through the through-hole into the preliminary imprint to form a final imprint around the tooth. The final imprint, that can e. g. be used for casting a model of the tooth, is then removed from the human mouth.

The method according to the invention can e. g. be conducted by a dentist. However, the skilled person is aware that the method in most cases will be conducted by an assistant of the dentist or another non-medical personal, e. g. a worker in a dental laboratory. As such, the method of the present invention is not a method of surgery, therapy or any diagnostic method, but rather is part of a process of obtaining a model for a dental restauration.

The inventor found, that the above-described method of the invention yields excellent results. However, in some cases the fit between the tooth and the preliminary imprint can already be so tight, that the clearance between the tooth and the first dental impression material is not sufficient to allow for a complete penetration of the second dental impression material along the tooth, potentially reducing the accuracy at certain points of the imprint. Therefore, the inventor suggests that the preliminary imprint around the tooth of interest can be slightly shaped before application of the second dental impression material in order to remove some material and to increase the clearance. For this, e. g. the drilling device can be employed that is also used to establish the fluid communication with the cavity anyway. In a more preferred embodiment, a specific shaping tool can be used as explained below. In summary, a method according to the invention is preferred, wherein step d) also comprises the shaping of the preliminary imprint with a shaping tool to increase the clearance of the at least one tooth in the preliminary imprint.

It is a specific advantage of the present invention, that it is easy to remove any contaminants or remnants from the manufacturing steps by simply pressing, e. g. compressed air as is readily available for most workers in the dental field, through the aperture into the preliminary imprint, since a particular efficient cleaning can be achieved this way. Hence, a method according to the invention is preferred, wherein step d) also comprises the removing of remnants of the penetration by pressing a gas, preferably air, through the aperture into the cavity and through the through-hole into the preliminary imprint.

Generally, a method according to the invention is preferred, wherein before step e) the at least one tooth and the surrounding areas of the mouth are dried, preferably using compressed air.

The skilled person is well aware of suitable dental impression materials. The method of the present invention and the impression tray of the present invention are not limited to specific dental impression materials. The skilled person can e. g. obtain the respective materials directly from specialist suppliers and can adapt the shape of the dental impression tray to the peculiarities of a dental impression material if required. For example, the skilled person can adapt the volume of the cavity and the injection pressure as well as the diameter of the through-hole to fit the physical-chemical properties of the second dental material and to allow for a sufficient flow.

In agreement with the skilled person's understanding, the term dental impression material is implying a typical suitability of the materials and is e. g. covering waxes, plastic compositions or curable polymer compounds. Among the broad variety of possible materials, the inventor considers the use of silicone rubber compounds for the dental impression materials to be superior for most applications, as the use of these materials typically results in very accurate impressions, without the danger of health risks to the patient. As disclosed above, for obtaining the best results and for allowing an efficient procedure, it will be recommended in most cases that the second dental impression material, i. e. the impression material that is injected through the cavity and the through-hole, should have a lower viscosity than the first dental impression material. Such materials are freely available from typical suppliers and are oftentimes labelled with indicators like "low viscosity" or similar. Correspondingly, a method according to the invention is preferred, wherein the first dental impression material and/or the second dental impression material comprises a silicone rubber, and/or wherein the second dental impression material has a lower viscosity than the first dental impression material.

It is an advantage of the method of the present invention that those tools, that are available to the dentist and/or dental laboratories anyway, can be employed.

Accordingly, a method according to the invention is preferred, wherein the drilling tool is a dentist drill, wherein the drilling tool preferably has a diameter in the range of 2 to 5 mm, preferably in the range of 3 to 4 mm, and/or wherein the shaping tool is a sickle probe or scaler, preferably a sickle probe, and/or wherein the injection apparatus is a syringe.

For the overall process of making an impression, the inventors suggest specific procedures that typically yield excellent results. Specifically, a method according to the invention is preferred, wherein in step c) pressure is applied to the filled impression tray, preferably by biting the teeth, in order to enhance the imprint of the at least one tooth in the first dental impression material, and/or wherein in steps e) and f) pressure is applied to the modified filled impression tray, preferably by biting the teeth, in order to enhance the fitting of the at least one tooth in the preliminary imprint. Likewise, a method according to the invention is preferred, wherein in step f) the second dental impression material is allowed to cure for a time in the range of 10 to 180 s, preferably in the range of 20 to 60 s.

It is an advantage of the present invention that excellent results can be obtained without the need for retraction cords. While the use of retractions cords may be expedient for certain applications and/or to further enhance the accuracy of the impression at certain points, it is explicitly preferred for most applications that no retraction cords are used as this results in a very time-efficient process that is oftentimes considered more pleasant by the patient. Therefore, a method according to the invention is preferred, wherein no retraction cords are used to prepare the at least one tooth before step f).

It is an advantage of the present invention, that no unnecessary delaminating force is applied between the first dental impression material and the impression tray. However, in particular if a plane base surface is used, the inventor suggests to also use an adhesive to facilitate the bonding, as this can be beneficial during the penetrating step to avoid delamination through vibrations caused e. g. by the drill. Thus, a method according to the invention is preferred, wherein in step b) an adhesive is used to facilitate the bonding between the first dental impression material and the base surface.

The skilled person understands that the above benefits of the inventive method transfer to a process of producing a dental prothesis or dental restauration. Hence, the invention also relates to a process of producing a dental prosthesis, in particular a dental crown, comprising the steps of the method of creating a dental impression according to the invention, as well as the step:

h) producing a dental prosthesis for the at least one tooth based on the final imprint or based on a model that was made from the final imprint.

In view of the above, the invention is also related to a dental prothesis. Specifically, disclosed herein is a dental prosthesis, produced by the process according to the invention.

The skilled person understands that the invention is also related to the use of impression trays as detailed above. More precisely, also disclosed herein is the use of an impression tray according to the invention for creating dental impressions.

Finally, the inventor suggests that impression trays of the present invention could most conveniently be provided in the form of a specific kit, that also provides the other elements required to practice the method of the present invention. Therefore, disclosed herein is a kit for creating dental impressions, the kit comprising:

one or more impression trays according to the invention, and one or more drilling tools and/or one or more drilling heads for a drilling tool, and optionally one or more shaping tools.

Preferred is a kit according to the invention, further comprising a first dental impression material, and/or a second dental impression material, wherein the first dental impression material and/or the second dental impression material is preferably provided in an injection apparatus.

Figure 2:
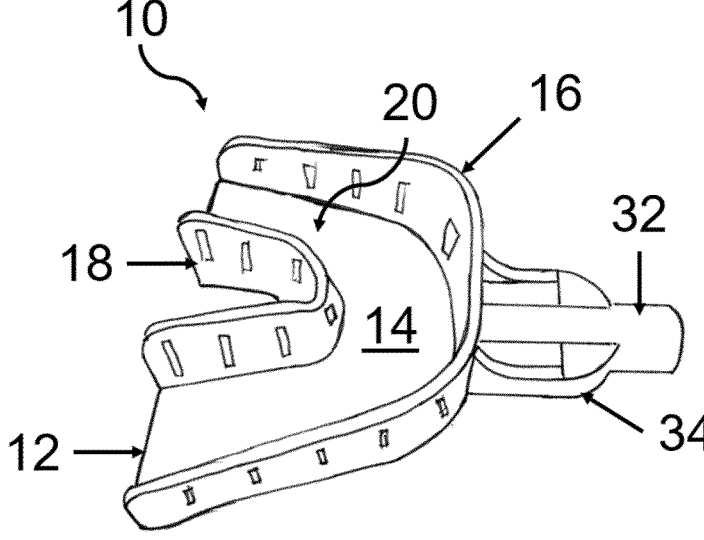
Figure 3:
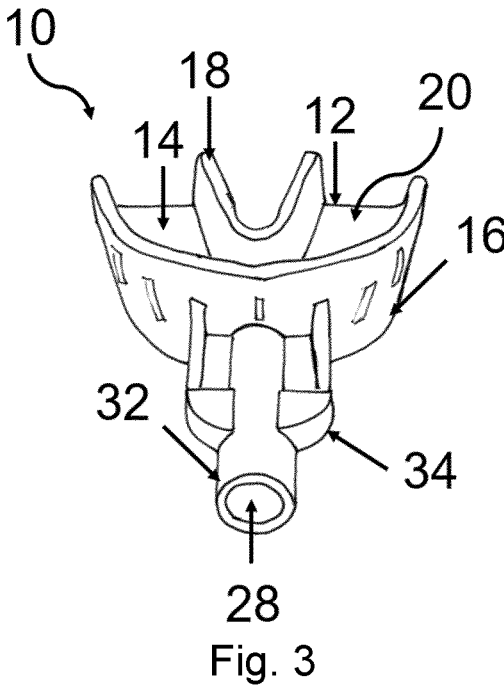
Figure 4:
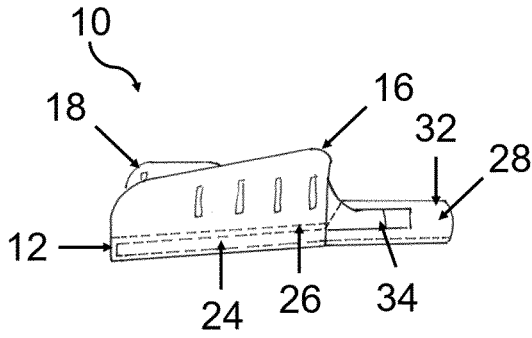
Figure 5:
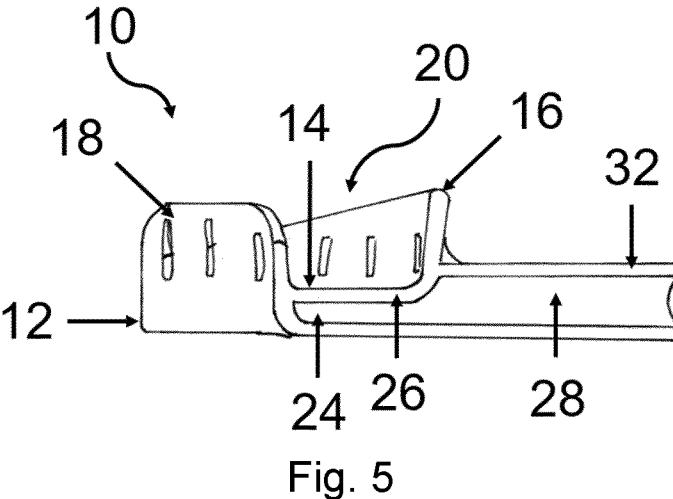
Figure 6:
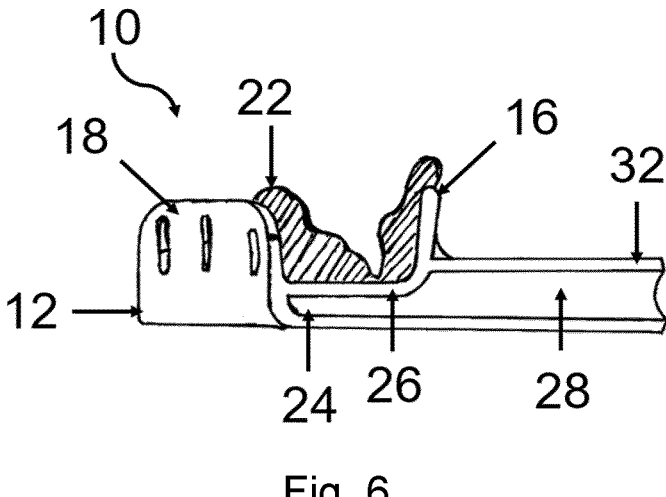
Figure 7:
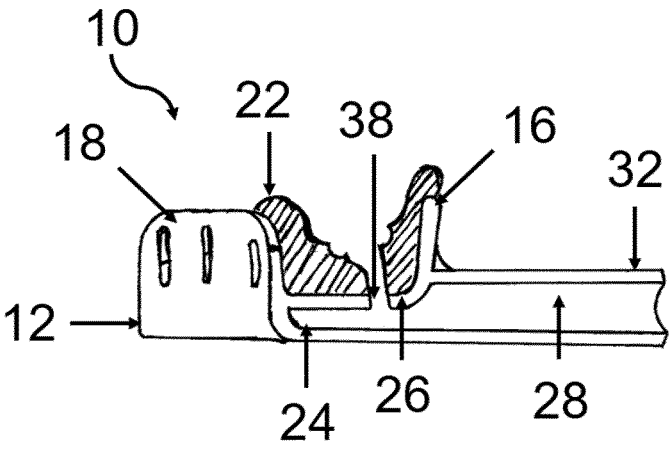
Figure 8:
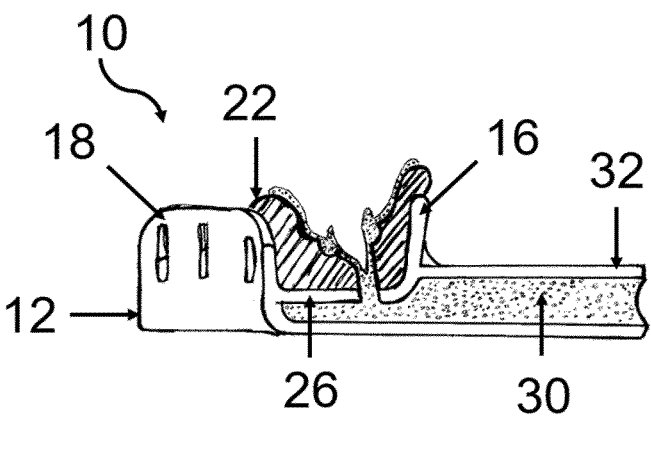
Figure 9:
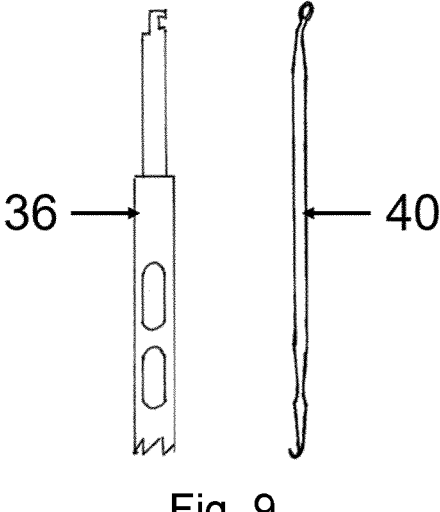

Hereinafter, preferred embodiments of the invention are explained and described in more detail with reference to the accompanying figures. The figures show:

FIG. 1 Two impression trays that are not according to the invention and adapted for placement in the upper and lower jaw of a human mouth;

FIG. 2 An exemplary representation of an impression tray of the present invention in a preferred embodiment in a first perspective;

FIG. 3 A second perspective of the impression tray of FIG. 2;

FIG. 4 A third perspective of the impression tray of FIGS. 2 and 3;

FIG. 5 A cross-sectional visualisation of the method of the present invention using an impression tray of the present invention in a preferred embodiment at a first point of conducting method;

FIG. 6 A cross-sectional visualisation of the method of the present invention using an impression tray of the present invention in a preferred embodiment at a second point of conducting method;

FIG. 7 A cross-sectional visualisation of the method of the present invention using an impression tray of the present invention in a preferred embodiment at a third point of conducting method;

FIG. 8 A cross-sectional visualisation of the method of the present invention using an impression tray of the present invention in a preferred embodiment at a fourth point of conducting method;

FIG. 9 An exemplary drilling tool and an exemplary shaping tool useful for the method according to the invention.

FIG. 1 depicts two impression trays 10 that are not according to the invention but that comprise the typical elements of an impression tray 10 and can be used for creating dental impressions with the methods of the prior art. These impression trays 10 comprise a base element 12 with a base surface 14 that is surrounded by a first boundary element 16 and a second boundary element 18, that are arranged at the base element 12 to form a receiving tray 20 that is adapted to receive a first dental impression material 22.

FIGS. 2, 3 and 4 show a schematic representation of an impression tray 10 according to the invention in three different perspectives. Like the impression trays 10 of FIG. 1, the impression tray 10 comprises a base element 12 with a base surface 14 that is arranged between a first boundary element 16 and a second boundary element 18 to form a receiving tray 20. In the base element 12, the impression tray 10 comprises a cavity 24 that extends underneath the base surface 14. The resulting base layer 26 is separating the cavity 24 and the receiving tray 20 and has an aperture 28 that is in fluid communication with the cavity 24. In the present example, the impression tray 10 completely consists of polypropylene and was made by injection moulding. The impression tray 10 comprises a base element 12 that consists of a single part, wherein the base surface 14 comprises a plurality of macroscopic protrusions (not shown) that uniformly extend over the entire surface area.

The first boundary element 16 is a boundary wall and comprises a plurality of holes that allow the first dental impression material to release some pressure when creating the preliminary impression. In the exemplary impression tray 10 the cavity 24 extends fully underneath the base surface 14, wherein the cavity 24 comprises only a single aperture 28 and is otherwise airtight. The aperture 28 extends from the cavity 24 through the base element 12 to the outer surface of the impression tray 10 and is connected with a tube 32 that is part of a handle 34.

In a preferred embodiment of the depicted impression tray 10 the first boundary element 16, the second boundary element 18, the tube 32 and the handle 34 and parts of the base element 12 could be manufactured of a metal, e. g. aluminium, while the base layer 26 and the base surface 14 could be made from a plastic, e. g. polypropylene and designed to be removable and exchangeable to allow for a partly reusable impression tray 10.

FIGS. 5 to 8 depict the use of the impression tray 10 as shown in FIGS. 2 to 4 in a method of creating a dental impression according to the invention using schematic cross-sectional views at different stages of the method. In FIG. 5 the impression tray 10 is shown before application of the first dental impression material 22.

FIG. 6 shows the impression tray 10 with the preliminary imprint of a tooth in the first dental impression material 22 that in this case is a silicone rubber with a comparably high viscosity that was allowed to cure in the human mouth for about 45 seconds.

FIG. 7 depicts the result of the drilling step, wherein the first dental impression material 22 and the underlying base layer 26 are penetrated with a drilling tool 36 to form a through-hole 38 that establishes a fluid communication between the cavity 24 and the preliminary imprint.

FIG. 8 depicts the impression tray 10 as obtained after removing the impression tray with a final imprint from the human mouth. It can be seen that the second dental impression material 30, in this case a silicone rubber with a comparably low viscosity, was injected through the aperture 28, the cavity 24 and the through-hole 38 into the preliminary imprint and has precisely adapted to the shape of the tooth.

In the method depicted in FIGS. 5 to 8, the clearance of the tooth in the preliminary imprint was increased before the application of the second dental impression material 30 and any remnants from the penetration and shaping step were removed by cleaning the impression tray 10 with compressed air that was injected for 10 s through the aperture 28. The final impression obtained in FIG. 8 can be used to make a model that can e. g. be used in producing a dental prothesis.

FIG. 9 depicts an exemplary drilling tool 36 as well as an exemplary shaping tool 40 that can be used in a preferred embodiments of the method of the present invention.

REFERENCE SIGNS

10 Impression tray
12 Base element
14 Base surface
16 First boundary element
18 Second boundary element
20 Receiving tray
22 First dental impression material
24 Cavity
26 Base layer
28 Aperture 30 Second dental impression material
32 Tube
34 Handle
36 Drilling tool
38 Through-hole
40 Shaping tool

The invention claimed is:

1. An impression tray for creating a dental impression of at least one tooth, comprising:
   a base element with a base surface,
   a first boundary element, and
   a second boundary element,
wherein the first boundary element and the second boundary element are arranged at the base element to form a receiving tray between the first boundary element, the base surface and the second boundary element, that is adapted to receive a first dental impression material,
wherein the base element comprises a cavity that at least partially extends underneath the base surface so that the cavity and the receiving tray are separated by a base layer of the base element, and wherein the base element comprises an aperture that is in fluid communication with the cavity and adapted to allow injection of a second dental impression material into the cavity, and
wherein the base element consists of a single part.

2. The impression tray according to claim 1, wherein the base element and the base layer consist of a rigid material.

3. The impression tray according to claim 2, wherein the rigid material comprises a metallic material, a ceramic material or a rigid plastic material.

4. The impression tray according to claim 1, wherein the cavity extends centrally underneath the base surface.

5. The impression tray according to claim 4, wherein the cavity extends centrally underneath the base surface.

6. The impression tray according to claim 5, wherein the cavity extends over the whole length of the base surface.

7. The impression tray according to claim 5, wherein a width of the cavity is in a range of one or more of 20 to 80%, 30 to 70%, and 40 to 60%, of a respective width of the base surface.

8. The impression tray according to claim 1, wherein except for the aperture the cavity is airtight.

9. The impression tray according to claim 1, wherein the aperture is connected with a tube.

10. The impression tray according to claim 9, wherein the tube is adapted to receive an injection element of one or more of an injection apparatus and a syringe.

11. The impression tray according to claim 9, wherein the tube is part of a handle that facilitates one or more of handling of the impression tray, placement of the impression tray in a mouth, and removal of the impression tray from the mouth.

12. The impression tray according to claim 1,
   wherein the base layer comprises no through-holes that would connect the receiving tray with the cavity.

13. A method of creating a dental impression of at least one tooth using an impression tray according to claim 1, the method comprising:
   a) providing an impression tray according to claim 1,
   b) filling the receiving tray with a first dental impression material to obtain a filled impression tray,
   c) placing the filled impression tray in a human mouth so that at least one tooth is arranged in the first dental impression material, in order to obtain a preliminary imprint of the at least one tooth in the first dental impression material,
   d) removing the impression tray with the preliminary imprint from the mouth and penetrating the first dental impression material, as well as the underlying base layer with a drilling tool, for forming a through-hole and establishing a fluid communication between the cavity and the preliminary imprint, thereby obtaining a modified filled impression tray,
   e) placing the modified filled impression tray back into the human mouth so that the at least one tooth is again arranged in the preliminary imprint,
   f) injecting a second dental impression material through the aperture into the cavity so that the second dental impression material is pressed through the through-hole into the preliminary imprint and adapts to the shape of the at least one tooth to form a final imprint,
   g) removing the impression tray with the final imprint from the human mouth.

14. The method according to claim 13, wherein step d) also comprises shaping of the preliminary imprint with a shaping tool to increase the clearance of the at least one tooth in the preliminary imprint, and/or
   wherein step d) also comprises the removing of remnants of the penetration by pressing one or more of a gas and air, through the aperture into the cavity and through the through-hole into the preliminary imprint.

15. The method according to claim 14, wherein the second dental impression material has a lower viscosity than the first dental impression material.

16. The method according to claim 13,
   wherein the second dental impression material has a lower viscosity than the first dental impression material.

17. The method according to claim 13, wherein penetrating the first dental impression material occurs at a bottom of the preliminary imprint.

18. A process of producing a dental prosthesis comprising the steps of the method of creating a dental impression according to claim 13, and further comprising:
   h) producing a dental prosthesis for the at least on tooth based on the final imprint or based on a model that was made from the final imprint.

* * * * *